United States Patent
Bennett et al.

[15] 3,696,591
[45] Oct. 10, 1972

[54] AIR CLEANER WITH IMPROVED UNLOADING APPARATUS

[72] Inventors: Raymond G. Bennett, Olympia Fields, Ill.; Mark Luedi, Valparaiso, Ind.

[73] Assignee: Novo Industrial Corporation-United Air Cleaner Division, New York, N.Y.

[22] Filed: June 7, 1971

[21] Appl. No.: 150,819

Related U.S. Application Data

[63] Continuation of Ser. No. 790,259, Jan. 10, 1969, abandoned.

[52] U.S. Cl. .................55/337, 55/429, 55/430, 55/435, 55/459, 55/466
[51] Int. Cl. .................................B01d 59/50
[58] Field of Search........55/337, 428, 429, 430, 431, 55/432, 433, 435, 459, 466

[56] References Cited

UNITED STATES PATENTS

| | | | |
|---|---|---|---|
| 2,716,464 | 8/1955 | Weisbecker | 55/429 UX |
| 3,048,959 | 8/1962 | Lowther | 55/429 X |

*Primary Examiner*—Dennis E. Talbert, Jr.
*Attorney*—Parker, Carter and Markey

[57] ABSTRACT

An air cleaner of the dry type having a generally cylindrical housing with an air inlet at one end and a clean air outlet at the other end, said housing constructed to set up a helical swirling motion of air therein to centrifuge dust particles to the outside, and a generally cylindrical annular filter element assembly centrally disposed within the housing. In addition the air cleaner includes a dust unloading apparatus having a port for dust removal, a means for moving air which produces suction at the port and a power source for driving said means.

3 Claims, 3 Drawing Figures

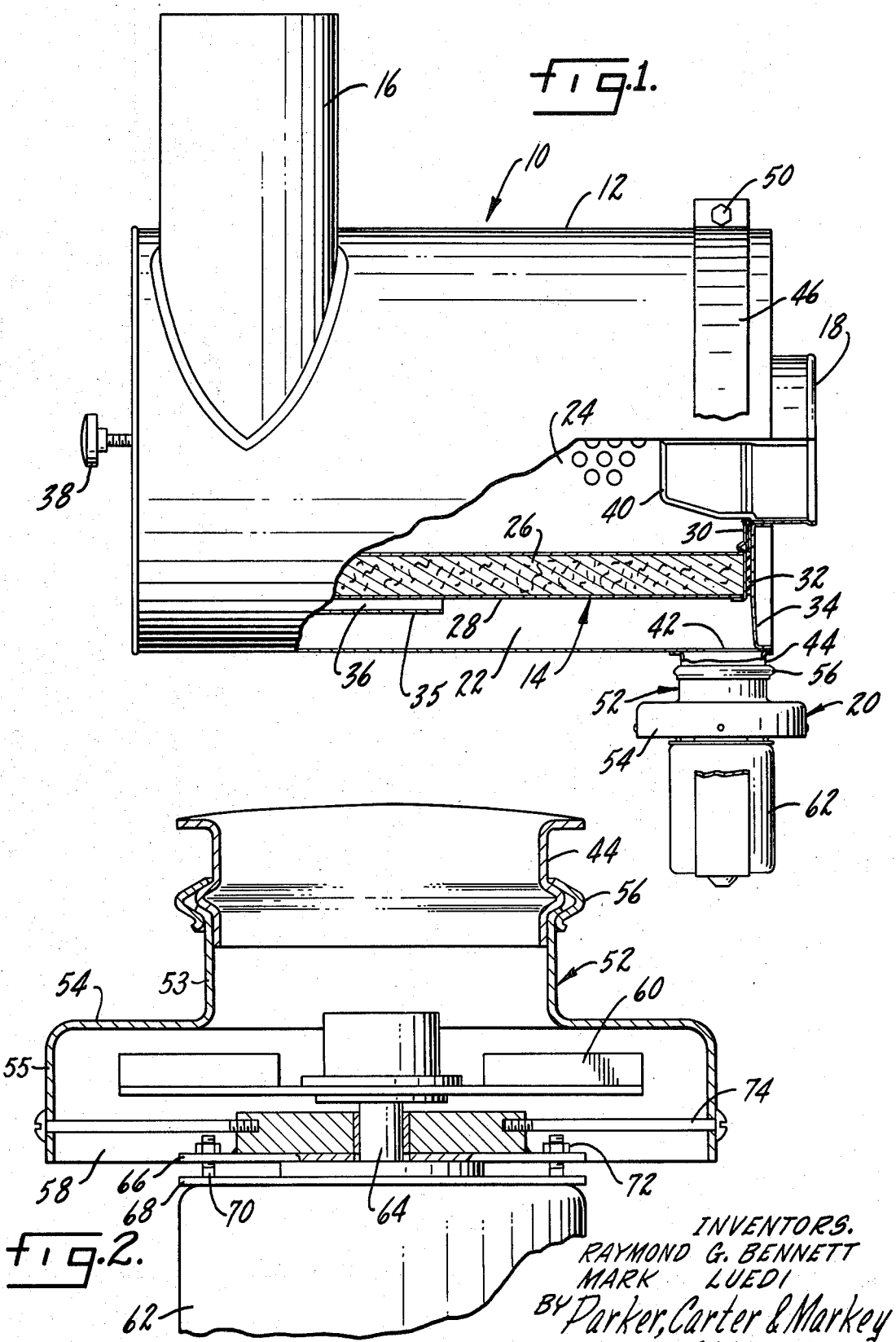

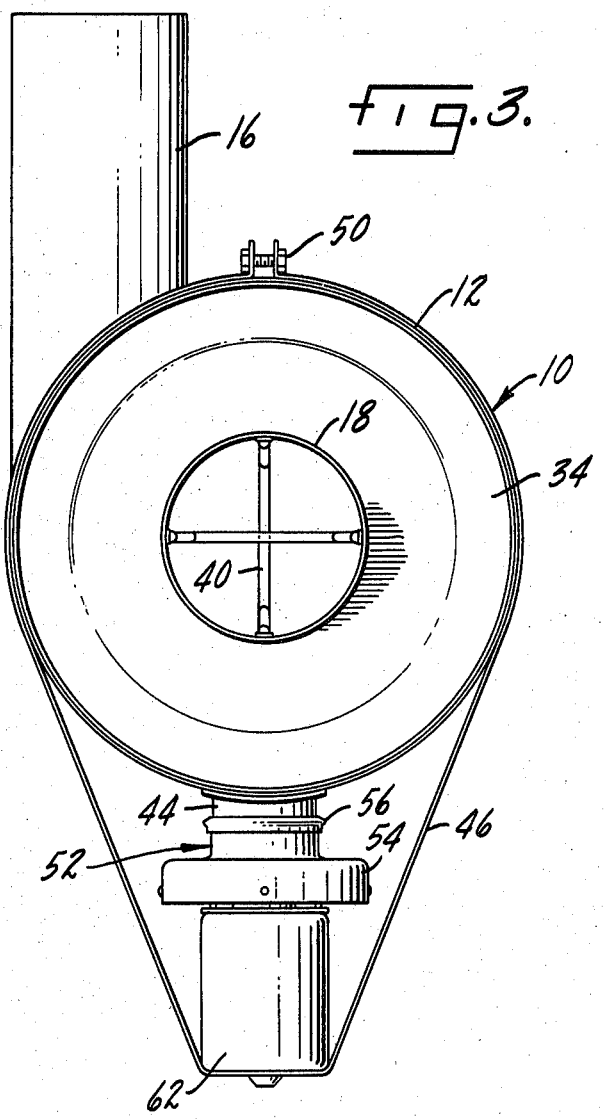

AIR CLEANER WITH IMPROVED UNLOADING APPARATUS

This is a continuation of Ser. No. 790,259, filed Jan. 10, 1969, now abandoned.

SUMMARY OF THE INVENTION

This invention relates to improvements in air cleaners of the dry type, and more particularly to improvements in the apparatus for removing dust and other foreign particles from air cleaners.

Accordingly, a primary object of this invention is an air cleaner of the dry type having improved means for removing air born dust particles which are drawn into the air cleaner through an air inlet.

A further object is an air cleaner having an increased dust capacity wherein incoming air is centrifuged and passed through a plurality of filtering steps each removing different size dust particles.

Another object is an efficient and long lasting air cleaner that discharges dust particles out a dust port while moving air through the housing in a helical pattern to the clean air outlet.

Another object is an air cleaner of the dry type which has a high capacity and high efficiency that requires a minimal amount of maintenance.

Another object is an all dry air cleaner with improved unloading apparatus that increases pre-cleaning efficiency.

Other objects and advantages will be apparent from the ensuing specification, claims and drawings for this invention.

BRIEF DESCRIPTION OF THE DRAWINGS

This invention is illustrated by the accompanying drawings wherein:

FIG. 1 is a side elevation view of an air cleaner with improved unloading apparatus, partly in section;

FIG. 2 is an enlarged partial section view showing a portion of the unloading apparatus in more detail; and FIG. 3 is an end view of FIG. 1.

DESCRIPTION OF THE PREFERRED EMBODIMENTS

Referring to the drawings in more detail it will be seen that this invention includes an air cleaner 10 of the dry type having a generally cylindrical housing 12 with a generally cylindrical filter element assembly 14 mounted therein. The cylindrical housing 12 preferably has a tangentially disposed air inlet 16 at one end and a centrally or axially disposed clean air outlet 18 at the other end. A dust unloading apparatus 20 is located along the base of the housing 12 for removing dust and other foreign particles.

The housing 12 and filter element assembly 14 are separated from each other to form an annular space 22 within the housing. By placing the inlet 16 tangentially the incoming air will flow into the housing 12 along the periphery to set up a helical swirling motion of air within the annular space 22. This action centrifuges the dust and other particles to the wall of the housing 12 where they are discharged into the dust unloading apparatus or aspirator assembly 20.

As shown in FIG. 1 the filter element assembly 14 may consist of an inner core 24 surrounded by a suitable filter material 26. The filter material may be surrounded by an outer perforate metal shield 28. The end of the filter element assembly 14 is preferably fitted with an end cap 30. A seal or gasket 32 may be provided to bear against a flat surface on an annular end plate 34 of the housing.

The inlet end of the housing 12 may have a cylindrical shroud or shield 35 which projects inside the housing a suitable distance but is somewhat larger than the filter element so as to be spaced therefrom as at 36. The shroud or shield prevents the entering dirty air from blasting or impinging directly upon the filter element but is spaced as at 36 allowing the full length of the filter element to be usable. While inlet 16 has been shown as tangential, which is preferred, it might be otherwise. For example, the inlet might be axially disposed in the form of an annulus at the left end of the housing. Or it might be radially disposed on the side of the housing with suitable internal vanes or guiding surfaces to set up a tangential swirl of the dirty air.

A screw or stud 38 is provided to apply an axial thrust to the filter element assembly 14 and will force the gasket or seal 32 into tight sealing engagement on the annular end plate 34. The result is a tight seal at the outlet 18.

The clean air outlet 18 in the form of a tube projects from the end plate 34 so that it may be suitably connected to an engine or other air consuming device. While we have shown the clean air outlet 18 at the opposite end from the inlet 16, it should be understood that this could be reversed or they might be at the same end. We provide a piloting arrangement, designated 40 in FIG. 1, which may take the form of a wire bail to properly center and position the filter element which is removable for cleaning or replacement in a conventional manner. While the pilot 40 has been shown inside the filter element, it could be outside in the form of an annular shield or shoulder, or a plurality of positioning buttons or projections. The point is that we find it useful to provide positioning means at the closed end of the housing to aid in properly centering the element.

The outlet end of the housing 12 is provided with a suitable opening or port 42 for dust, dirt or other foreign particles. As shown in FIGS. 1 and 3 the unloading apparatus 20 is mounted immediately adjacent the dust port 42 and an adapter 44 or the like, welded or otherwise mounted over the dust port on the housing. A strap 46 releaseably secured around the housing 12 by a suitable fastener 50 may be provided to support the unloading apparatus in its proper position.

FIG. 2 shows the dust unloading apparatus 20 in more detail. The dust unloading apparatus includes a fitting 52, means for moving air which produces suction at the port 42 and a power source for driving the means for moving air.

The fitting 52 communicates with the annular space 22 between the housing and the filter element assembly through the dust port 42 in the base of the housing 12 and the adapter 44. The fitting 52 is about the same diameter as the adapter 44 in its upper portion 53, and flares out, as at 54, say, half way down, to a skirt 55. The adaptor 44 and fitting or cover 52 may be sealed together by an annular clamp, as shown at 56. Dust and other foreign particles are discharged to the atmosphere out the annular open lower end 58 of the cover 52.

The means for moving air to produce suction at the dust port 42 is preferably a blower or fan as shown at 60. The blower or fan 60 may be mounted immediately adjacent the upper portion 53 of the fitting 52 as shown, or it may be mounted remotely from the air cleaner 10 as long as it produces sufficient suction at the port. A single or double impeller turbine type blower driven by an electric motor 62 such as used on automotive accessories has been found satisfactory.

The power for the blower or fan 60 may be provided by the electric motor 62 connected to the blower or fan by a drive shaft 64. Suitable fastening means such as plates 66 and 68, bolts 70, nuts 72, and screws 74 support the power source in its proper position and relationship.

The use, operation and function of this invention are as follows:

Air to be cleaned is brought into the housing 12 through the inlet 16 and moves in a swirling motion toward the clean air outlet 18. The swirling or rotating motion of the air centrifuges the dust, dirt or other foreign particles to the periphery of the cylindrical housing 12. Through centrifugal action and the force of gravity the dust passes through the opening 42 in the base of the housing 12 into the dust unloading apparatus 20. The remaining dust is removed when the swirling air moves inwardly through the filter element assembly 14. The clean air then flows axially out the air outlet 18.

Operation of the dust unloading apparatus 20 induces and maintains a flow of air from the interior of the housing 12 to the atmosphere. To accomplish this flow of air the blower or fan 60 must overcome the below ambient pressure in the housing 12 caused by the air consuming device the cleaner is used with, for example, an internal combustion engine. Air born dust which is drawn into the air cleaner 10 is carried by the current of air through the blower or fan 60 and then exhausted to the atmosphere.

The dust unloading apparatus 20 improves the precleaning efficiency and increases the dust capacity of the air cleaner 10. By increasing the dust capacity this invention allows the parts of the air cleaner to have a longer life. In addition the improved unloading apparatus 20 reduces the number of times you have to clean or service the parts for this invention. Servicing an air cleaner can be expensive. The less frequently the element needs service, the less expensive the overall cost of the unit. By forcefully discharging the dust through the dust port, we substantially reduce the amount of dust that the filter element must handle. In effect, the overall efficiency of the precleaning function or stage substantially increases. A small increase in pre-cleaner efficiency will give a big increase in, first, life of the filter element, and second, saving in the labor cost of servicing the unit.

While the dust port 42 has been shown on the side wall, it might be on the end or at an angle.

We claim:

1. For use in an air cleaner of the dry type having a generally cylindrical housing with a generally cylindrical filter element assembly mounted therein, said housing and filter element assembly defining an annular space therebetween and constructed to set up a helical swirling motion of air therein to centrifuge the dust to the outside of said housing, a dust unloading apparatus including a dust port in the housing opposite the filter element for dust removal communicating with the annular space between the housing and the filter element assembly, an electric motor and fan unit mounted on the housing aligned with and directly adjacent the dust port, and an annular discharge around the motor and fan unit such that dust discharged from the dust port will be exhausted throughout the 360° periphery thereof, the dust port being in the cylindrical sidewall of the housing so the dust removal is effected radially from the annular space between the housing and filter element assembly, the motor and fan unit being mounted generally radially on the housing opposite the dust port, a fitting on the sidewall of the housing over and surrounding the dust port and defining a closed passage between the dust port and fan unit, the fan unit being mounted axially on the other end of the closed passage defined by the fitting and having a fan impeller directly adjacent the other end of the passage, the impeller having a slightly larger diameter than the passage so that it radially bounds the open end of the passage to effect maximum dust discharge from the port through the passage and out the annular discharge around the motor and fan unit.

2. For use in an air cleaner of the dry type having a generally cylindrical housing with a generally cylindrical filter element assembly mounted therein, said housing and filter element assembly defining an annular space therebetween and constructed to set up a helical swirling motion of air therein to centrifuge the dust to the outside of said housing, a dust unloading apparatus including a dust port in the housing opposite the filter element for dust removal communicating with the annular space between the housing and the filter element assembly, an electric motor and fan unit mounted on the housing aligned with and directly adjacent the dust port, and an annular discharge around the motor and fan unit such that dust discharged from the dust port will be exhausted throughout the 360° periphery thereof, a fitting on the housing over and surrounding the dust port and defining a closed passage between the dust port and fan unit, the fan unit being mounted axially on the other end of the closed passage defined by the fitting and having a fan impeller directly adjacent the other end of the passage, the impeller having a slightly larger diameter than the passage so that it radially bounds the open end of the passage to effect maximum dust discharge from the port through the passage and out the annular discharge around the motor and fan unit.

3. An air cleaner of the dry type having a generally cylindrical housing with a generally cylindrical filter element assembly mounted therein, said housing and filter element assembly defining an annular space therebetween and constructed to set up a helical swirling motion of air therein to centrifuge the dust to the outside of the housing, a dust unloading apparatus including a dust port in the housing opposite the filter element for dust removal therefrom communicating with the annular space between the housing and the filter element assembly, an adapter on the sidewall of the housing over and surrounding the dust port, means defining a closed passage to the dust port, an electric motor and fan unit mounted on and aligned with the interior of the closed passage so as to apply a vacuum therethrough to the dust port, and a discharge for the motor and fan unit, the fan unit being mounted axially on the other end of the closed passage and having a fan impeller directly adjacent the other end of the passage, the impeller having a slightly larger diameter than the passage so that it radially bounds the open end of the passage to effect maximum dust discharge from the port through the closed passage and out the discharge for the motor and fan unit.

* * * * *